United States Patent [19]

Mack

[11] Patent Number: 4,510,850

[45] Date of Patent: Apr. 16, 1985

[54] SEAL FOR ROTARY ACTUATOR

[76] Inventor: James F. Mack, 541 N. Bertrand, Flagstaff, Ariz. 86001

[21] Appl. No.: 443,324

[22] Filed: Nov. 22, 1982

[51] Int. Cl.³ .............................................. F01C 9/00
[52] U.S. Cl. ...................................... 92/125; 277/27; 277/81 P
[58] Field of Search ............... 92/125, 124, 123, 122, 92/120, 121; 277/27, 81 P

[56] References Cited

U.S. PATENT DOCUMENTS

| 3,032,020 | 5/1962 | Sneen | 92/125 |
| 3,049,103 | 8/1962 | Dumm | 92/122 |
| 3,592,104 | 7/1971 | Harness | 92/122 |

FOREIGN PATENT DOCUMENTS 2335692  7/1977  France .................................. 92/122

Primary Examiner—Paul E. Maslousky
Attorney, Agent, or Firm—Drummond & Nissle

[57] ABSTRACT

A vane-type hydraulically powered rotary actuator having a shaft provided with a radially extending vane. The shaft is rotatably carried inside a generally cylindrical actuator chamber formed in the housing of the rotary actuator. The vane includes a pair of end walls which move adjacent the actuator housing during operation of the rotary actuator. Improved means are provided for sealing the space between the end walls of the vane and the actuator housing during operation of the actuator.

2 Claims, 7 Drawing Figures

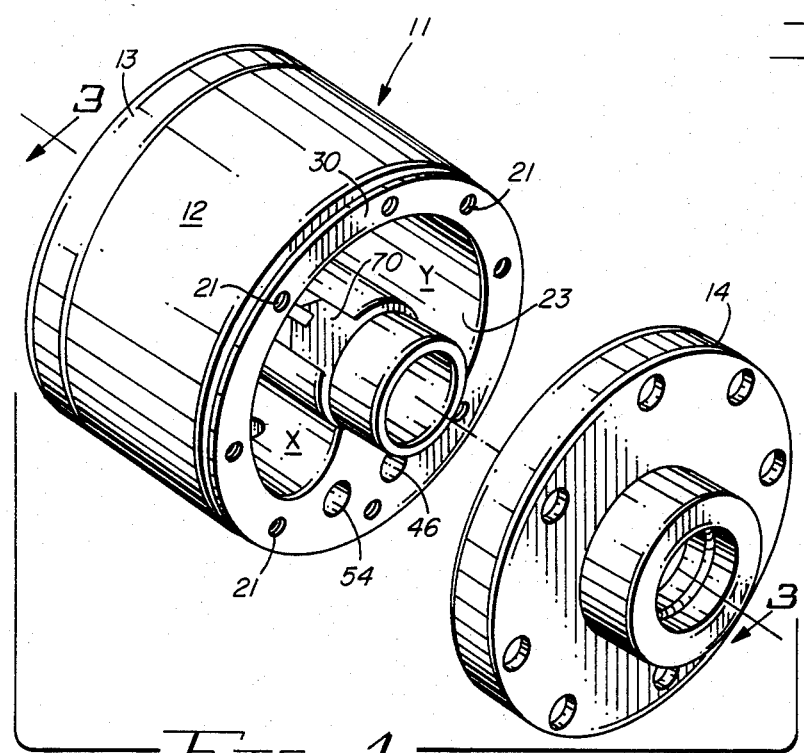
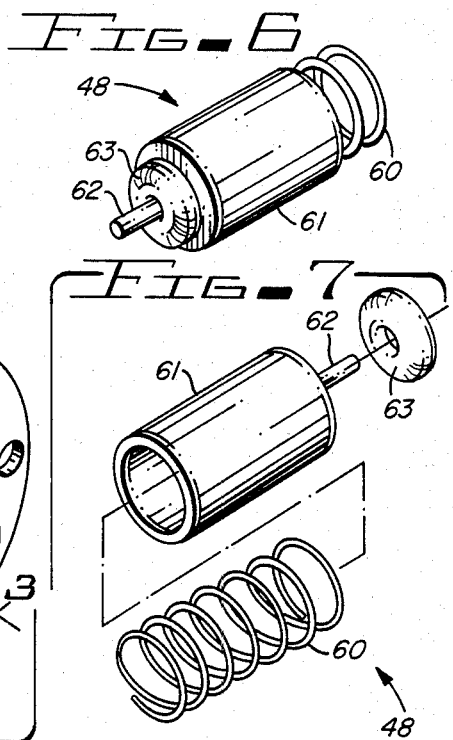
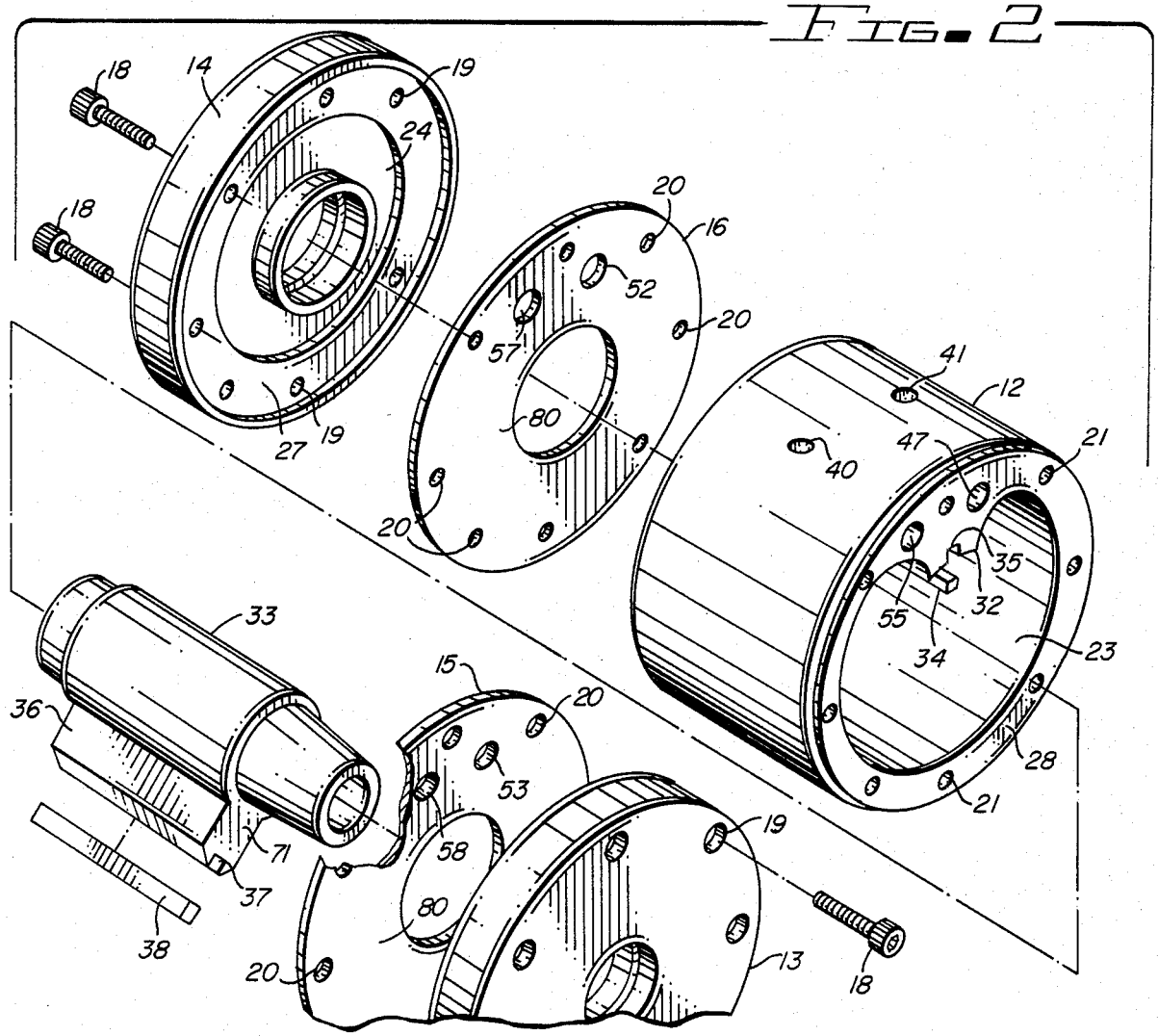

SEAL FOR ROTARY ACTUATOR

This invention relates to a mechanism for producing rotary power.

More particularly, the invention concerns a rotary power mechanism for alternately rotating a shaft in opposite directions through a desired arc.

In still a further aspect, the invention concerns an improved rotary power mechanism for alternately rotating a shaft in opposite directions through a desired arc by displacing a vane carried on the shaft, the vane and shaft being rotatably mounted inside a sealed housing such that fluid pressure applied to either side of the vane causes the vane to move in the opposite direction.

In still another respect, the invention concerns an improved rotary power mechanism of the type described in which the vane has a pair of end walls which each move over a planar seal surface positioned between the end walls of the vane and housing of the shaft rotation mechanism, the planar seal surface acting to more effectively prevent pressurized fluid from passing between the end walls of the vane and housing than do O-ring strip seals emplaced in the end walls of the vane in conventional rotary power mechanisms.

Prior art shaft rotation mechanisms or "rotary actuators" are utilized in performing a wide variety of movements and are generally powered with pressurized fluids. A rotary actuator commonly consists of a housing having a cylindrical chamber containing a fixed barrier or "shoe" and a rotatable central shaft having an outwardly projecting vane. Caps on either end of the housing enclose the cylindrical chamber. The ends of the rotatable shaft project through the caps. Pressurized fluid directed into the cylindrical chamber on either side of the vane causes rotation of the vane and shaft in the opposite direction. The vane has end walls which move over the inner faces of the caps during rotation of the vane and shaft. O-ring strip seals are carried in rectangular grooves formed in the end walls of the vane and prevent pressurized fluid from seeping between the end walls of the vane and the inner faces of the caps on either end of the housing. Some examples of prior art rotary actuators and similar devices may be seen in U.S. Pat. Nos. 2,854,956 to Hager, 3,021,822 to Rumsey, 3,023,741 to O'Conner, 3,128,679 to Trendle, 3,195,421 to Rumsey, et al., 3,318,201 to Blake, 3,359,871 to Kamman, 3,392,635 to Sperl, et al., 3,426,654 to Laughman and 4,296,681 to Rosheim.

Hydraulic and pneumatic rotary actuators of the type described have many advantages when used to produce angular rotations of a shaft. Rotary actuators are of relatively simple construction and can often replace larger types of actuators which require complicated linkage. Since the working mechanism of a rotary actuator is enclosed the sealed exposure of internal operative parts to dirt particles is minimized. Simple construction, a minimal number of moving parts and lack of eternal working parts reduce the wear, replacement and down time associated with rotary actuators.

However, a primary disadvantage associated with rotary actuators, especially in high pressure applications, is internal leakage. When pressurized liquid is injected into the actuator on one side of the vane, the liquid tends to seep between the O-ring strip seals in the end walls of the vane and the caps of the actuator housing. Problems connected with controlling internal leakage in rotary actuators are probably primarily responsible for the apparently small number of successful rotary actuator models on the market.

If, instead of mounting O-ring strips in the end walls of the vane, a planar seal surface was fixedly mounted inside the housing between each of the end walls of the vane and the housing and would contact a large portion of the surface area of the end walls of the vane as each of the vane end walls moved over the seal during rotation of the vane and shaft, then the effectiveness of the seal between the end walls of the vane and housing would be increased. The seal between the end walls of the vane and housing would be further improved if each of the planar seal surfaces was forced against one of the end walls of the vane during operation of the rotary actuator.

Accordingly, it would be highly desirable to provide an improved rotary actuator for turning a shaft through arcs of desired lengths in which leakage of pressurized fluid between the end walls of the vane and actuator housing was minimized by fixedly positioning a planar seal surface between the housing and each end wall of the vane.

It is therefore a principal object of the invention to provide an improved rotary power mechanism.

Another object of the instant invention is to provide an improved rotary power mechanism for alternately rotating a shaft in opposite directions through a desired arc or arcs.

A further object of the invention is to provide an improved rotary power mechanism for alternately rotating a shaft in opposite directions through desired arcs by displacing a vane carried on the shaft, the vane and shaft being rotatably carried inside a sealed housing such that fluid pressure applied to either side of the vane causes the vane to move in the opposuite direction, the vane including a pair of end walls which each move adjacent the housing.

Still another and further object of the invention is to provide an improved rotary actuator of the type described in which the space between the end walls of the vane and the housing is sealed by fixedly positioning a planar seal surface in the housing between the end walls of the vane and the housing rather than by emplacing O-ring strips in the end walls of the vane as is currently the practice.

Yet another object of the invention is to provide an improved vane type rotary actuator in which the planar seal surface between the end walls of the vane and housing is automatically forced against the end walls of the vane during operation of the actuator to further minimize leakage of pressurized fluid between the vane walls and seal.

These and other, further and more specifically objects and advantages of the invention will be apparent to those skilled in the art from the following detailed description thereof, taken in conjunction with the drawings, in which:

FIG. 1 is a perspective assembly view illustrating a rotary power mechanism constructed in accordance with the principles of the present invention;

FIG. 2 is a perspective assembly view further illustrating construction details of the rotary actuator of FIG. 1;

FIG. 6 is a perspective view of a check valve utilized in the rotary actuator of FIGS. 1 and 5; and, FIG. 7 is a perspective assembly view of the check valve of FIG. 6.

Figure 3:
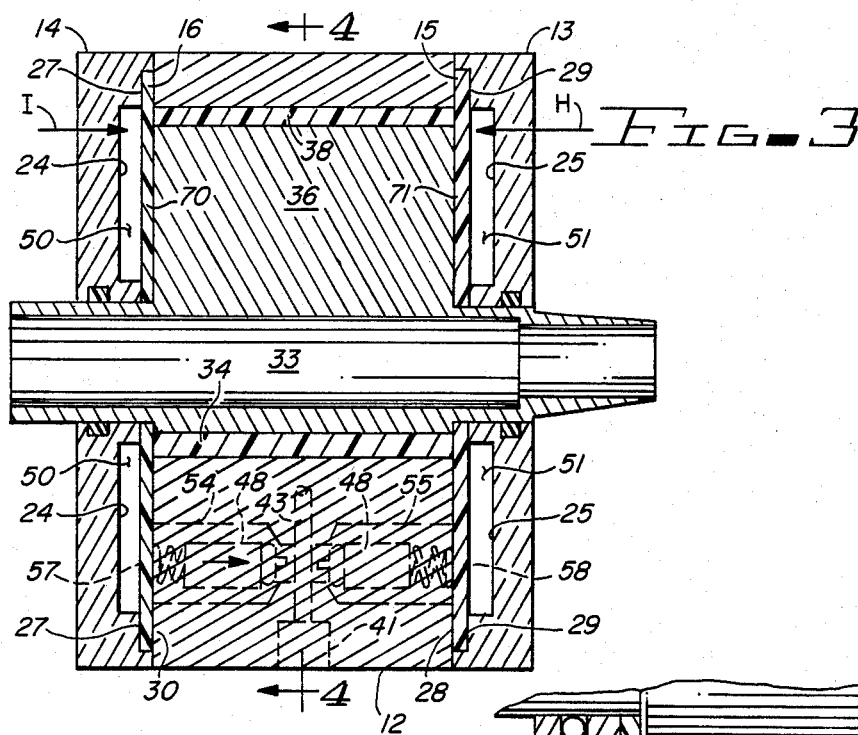
FIG. 3 is a side sectional view of the rotary actuator of FIG. 1 taken along section line 3—3 thereof.

Briefly, in accordance with my invention, I provide an improved rotary power mechanism. The mechanism generally includes a housing having an actuator chamber including a pair of end walls, a pair of seals each fixedly positioned adjacent at least a portion of one of the end walls and having a generally planar surface area facing the interior of the actuator chamber; a wingshaft rotatably carried inside the housing and having a hub rotatably contacting the housing and at least one vane extending radially from the hub, the vane and hub rotating between at least a first and second operative position during operation of the actuator. The vane has a pair of end walls which each contact and move over the planar surface area of one of the seals during rotation of the vane from the first to the second operative position. The rotary power mechanism may include means for pressing the planar surface areas of the seals against each end wall of the vane during operation of the mechanism.

Turning now to the drawings, which depict the presently preferred embodiment and best mode of the invention for the purpose of illustrating the practice thereof and not by way of limitation of the scope of the invention, and in which like reference characters refer to corresponding elements throughout the several views, FIGS. 1–7 illustrate a rotary power mechanism including a housing, generally indicated by reference character 11, including hollow center portion 12, caps 13, 14 and seals 15, 16. Threaded screws 18 pass through apertures 19 in caps 13, 14, apertures 20 in seals 15, 16 and are turned into internally threaded apertures 21 of center portion 12 to secure seals 15, 16 and caps 13, 14 in position on center portion 12 of housing 11. When housing 11 is assembled by securing seals 15, 16 and caps 13, 14 thereto with threaded screws 18, a generally cylindrical inner actuator chamber is formed including curved wall 23 and side walls 24, 25 of caps 13, 14. The peripheral outer areas of seal 16 are supported by and compressed between circular surface 27 of cap 14 and circular surface 30 of center portion 12. The peripheral outer areas of seal 15 are supported by and compressed between circular surface 29 of cap 13 and circular surface 28 of center member 12.

Shoe 32 rotatably supports shaft 33 within the cylindrical chamber of housing 11. Strip seal 34 in elongate groove 35 formed in shoe 32 prevents seepage of fluid between shaft 33 and shoe 32. Shaft 33 is provided with radially extending vane 36 having elongate groove 37 which receives strip seal 38. Strip seal 38 prevents seepage of pressurized fluid between vane 36 and inner curved wall 23 of the actuator chamber.

Figure 4:
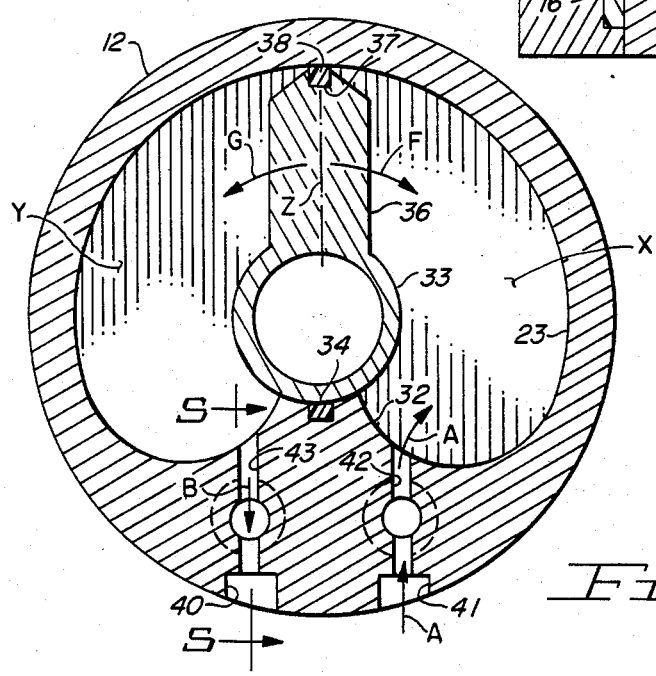
FIG. 4 is a sectional elevation view of the rotary actuator of FIG. 3 taken along section line 4—4 thereof.

As shown in FIG. 4, the actuator chamber is divided by vane 36 into a chamber X to the right of the vane and a chamber Y to the left of the vane. In operation, when it is desired to displace vane 36 in FIG. 4 to the left (to reduce the volume of chamber Y), then fluid pressure is applied through aperture 41 and channel 42 into chamber area X as indicated by arrows A. The pressurized fluid in chamber area X causes vane 36 in FIG. 4 to rotate to the left in the direction indicated by arrow G; unpressurized fluid in chamber area Y is forced out through channel 43 and aperture 40 as indicated by arrow B. To displace vane 36 to the right in the direction indicated by arrow F, the application of fluid pressure through aperture 41 and channel 42 is discontinued and fluid pressure is instead directed through aperture 49 and channel 43 into chamber area Y. The pressurized fluid in chamber Y causes vane 36 to rotate to the right in the direction of arrow F; unpressurized fluid in chamber X is forced out through channel 42 and aperture 41 as vane 36 rotates to the right. During the application of fluid pressure to either chamber X or Y, seals 34, 38 prevent fluid from seeping from one of chambers X, Y between vane 36 and housing 11 into the other chamber.

Figure 5:
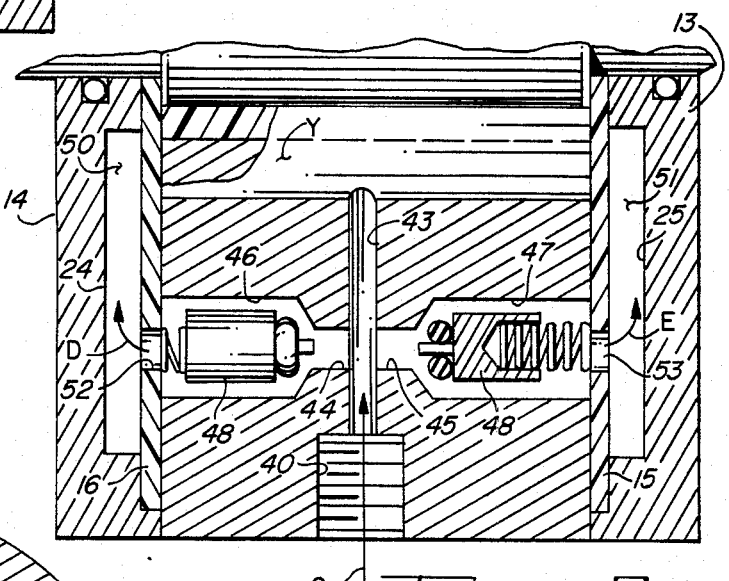
FIG. 5 is a sectional view of a portion of the rotary actuator of FIG. 4 taken along section line 5—5 thereof.

As shown in FIG. 5, channel 43, in addition to opening into chamber X, also opens into side conduits 44, 45 leading to check valve chambers 46, 47, respectively. Each chamber 46, 47 contains a check valve 48 which, as indicated in FIGS. 6 and 7, consists of a spring 60 housed in open ended cylinder 66. The closed end of the cylinder is provided with an outwardly projecting nipple 62 which receives resilient elastic doughnut 63.

When pressurized fluid is directed into aperture 40 as shown by arrow C in FIG. 5, some of the fluid travels through tube 43 into chamber Y. Another portion of the pressurized fluid causes check valves 48 in chambers 46 and 47 to open and then, as indicated by arrows D and E, flows through chambers 46 and 47 into circular donut shaped chambers 50, 51. Chamber 50 lies between seal 16 and recessed area 24 of cap 14. Chamber 51 lies between seal 15 and recessed area 25 of cap 13. Pressurized fluid from chamber 46 passes through circular aperture 52 of seal 16 into chamber 50. Pressurized fluid from chamber 47 passes through circular aperture 53 of seal 15 into chamber 51. When fluid pressure is transmitted through apertures 40, 51, 53 into chambers 50, 51 and Y, check valves 48 in chambers 54, 55 (See FIG. 3) remain closed. Pressurized fluid from chambers 50, 51 flows into chambers 54, 55 through apertures 57 and 58 in seals 16, 15 and, since the pressurized fluid acts to assist the expansion of springs 60 of check valves 48, valves 48 in chambers 54, 55 remain closed, allowing pressurized fluid from chamber X (or fluid maintained in chamber X at a lesser pressure than the fluid in chamber Y) to flow into conduit 43 and out of aperture 41.

When the pressure through aperture 40 on the fluid in chamber Y is reduced or discontinued and pressure is instead applied through aperture 41 to the fluid in chamber X, the above-described process is essentially reversed. Fluid pressure is applied through apertures 41, 57, 58 into chambers X, 50 and 51. Check valves 48 in chambers 54, 55 are open. Conversely, check valves 48 in chambers 46, 47 remain closed so that as vane 36 moves in the direction indicated by arrow G in FIG. 4, fluid in chamber Y can pass through conduit 43 and out of housing 11 through aperture 40.

An added advantage of the embodiment of the invention shown in the drawings is that the fluid pressure in chambers 50, 51 during operation of the rotary actuator forces diaphragm seals 15, 16 against end walls 70, 72 of vane 36. Arrows I, H in FIG. 3 demonstrate how fluid pressure in chambers 50, 51 forces seals 15, 16 against end walls 71, 70 of vane 36.

In conventional rotary actuators an O-ring strip is emplaced in the side walls 70, 71 to prevent pressurized fluid from seeping between walls 70, 71 and caps 14, 13. The utilization of pressure augmented seals 15, 16 shown in the drawings appears to provide a much more effective means for preventing a pressurized liquid or gas from passing between walls 70, 71 and caps 14, 13.

As would be appreciated by those of skill in the art, seals 15, 16 could be fabricated from a variety of materials which would, with or without the supplemental fluid pressure indicated by arrows I and H in FIG. 3, contact and interact with end walls 70, 71 of vane 36 to prevent fluid from seeping between end walls 70, 71 and seals 15, 16 during operation of the rotary actuator. Although the seals shown are circular panels it might be desirable to otherwise contour the back areas and inner and outer edges of the seals. If the seal surface areas interacting with walls 70, 71 of vane 36 are generally planar, the remaining portion of the seal can be shaped, contoured and dimensioned as desired. It might also be desirable to make the end walls 70, 71 of vane 36 slightly convex about axis Z in FIG. 4 so the edges of vane walls 70, 71 parallel to axis Z would not tend to "bite" into seals 15, 16.

Having described my invention in such terms as to enable those skilled in the art to which it pertains to understand and practice it, and having described the presently preferred embodiments thereof, I claim:

1. A rotary actuator comprising
   (a) a housing having an inner actuator chamber including a pair of side walls;
   (b) a pair of seals each fixedly positioned adjacent at least a portion of one of said side walls and having a generally planar surface area facing the interior of said actuator chamber;
   (c) a wingshaft rotatably carried inside said housing and having
   a hub rotatably contacting said housing, and
   at least one vane extending radially from said hub, said vane and hub rotating between at least a first and second operative position during operation of said actuator, said vane having a pair of end walls each contacting and moving over said planar surface area of one of said seals during rotation of said vane from said first to said second operative position; and,
   (d) means for forcing said seals away from said side wall of said housing and against said end walls of said vane.

2. The actuator of claim 1 wherein said means for forcing said seals away from said side wall includes means for directing pressurized fluid between said seals and said side walls, said pressurized fluid forcing
   (a) said seals away from said side wall of said housing, and
   (b) at least a portion of said planar surface area of said seals against said end walls of said vane.

* * * * *